(12) United States Patent
Zaar

(10) Patent No.: US 12,507,874 B2
(45) Date of Patent: Dec. 30, 2025

(54) ACTUATOR FOR AN ENDOSCOPIC PROBE, ENDOSCOPIC PROBE AND METHOD FOR CONTROLLING AN ACTUATOR OF AN ENDOSCOPIC PROBE

(71) Applicant: viZaar industrial imaging AG, Albstadt (DE)

(72) Inventor: Bjoern Simon Zaar, Albstadt (DE)

(73) Assignee: VIZAAR INDUSTRIAL IMAGING AG, Albstadt (DE)

( * ) Notice: Subject to any disclaimer, the term of this patent is extended or adjusted under 35 U.S.C. 154(b) by 724 days.

(21) Appl. No.: 17/419,555

(22) PCT Filed: Jan. 16, 2020

(86) PCT No.: PCT/DE2020/100029
§ 371 (c)(1),
(2) Date: Jun. 29, 2021

(87) PCT Pub. No.: WO2020/147894
PCT Pub. Date: Jul. 23, 2020

(65) Prior Publication Data
US 2022/0071477 A1     Mar. 10, 2022

(30) Foreign Application Priority Data
Jan. 16, 2019   (DE) ...................... 10 2019 101 089.6

(51) Int. Cl.
*A61B 1/005*    (2006.01)
*A61B 17/00*   (2006.01)

(52) U.S. Cl.
CPC .......... *A61B 1/0057* (2013.01); *A61B 1/0058* (2013.01); *A61B 2017/00398* (2013.01); *A61B 2017/00867* (2013.01)

(58) Field of Classification Search
CPC . A61B 1/0057; A61B 1/0058; A61B 1/00398; A61B 1/00867;
(Continued)

(56) References Cited

U.S. PATENT DOCUMENTS

| 4,601,283 A | 7/1986 | Chikama |
| 4,753,223 A | 6/1988 | Bremer |

(Continued)

FOREIGN PATENT DOCUMENTS

| CN | 203344284 U | | 12/2013 | |
| CN | 203468565 U | * | 3/2014 | ......... A61B 1/00174 |

(Continued)

OTHER PUBLICATIONS

Wikipedia, "Polyimide", Properties and Applications, https://en.wikipedia.org/wiki/Polyimide, Jun. 7, 2021, 3 pages.
(Continued)

*Primary Examiner* — Michael J Carey
*Assistant Examiner* — Timothy Tuan Luu
(74) *Attorney, Agent, or Firm* — Von Rohrscheidt Patents

(57) ABSTRACT

The invention relates to an actuator for an endoscopic probe, an endoscopic probe and a method for controlling an actuator of an endoscopic probe. The actuator is provided with an elongate shape memory wire (2) consisting of a shape memory alloy, with an electrical conductor (5) which is electrically conductively connected to the shape memory wire (2) and supplies the shape memory wire (2) with current, with a wire insulation (3) which surrounds at least some sections of the shape memory wire (2) and consists of an electrically insulating material and with a flexible sheath (4) which is pressure-resistant in the longitudinal direction of the shape memory wire (2). The shape memory wire (2) converts the electrical energy of the current flowing through said shape memory wire into thermal energy. Under the (Continued)

Figure 1:
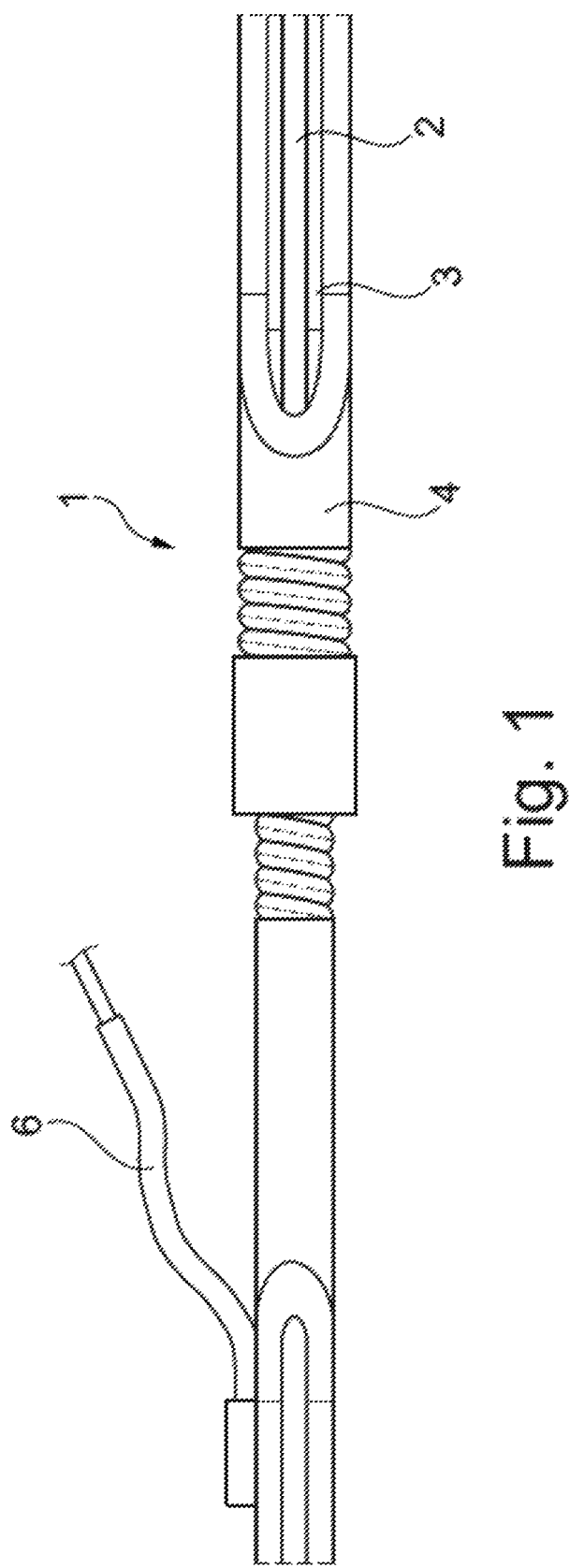

influence of this heat, the shape memory wire (2) changes its length from a first length to a second length. The sheath (4) forms a guide for the shape memory wire (2) and a counterbearing for supporting the tensile forces to be transmitted which are effective as a result of the change in shape of the shape memory wire (2).

26 Claims, 7 Drawing Sheets

(58) Field of Classification Search
CPC ........... A61B 2017/00867; A61B 2017/00398; A61B 17/00234; A61B 1/009; A61B 1/0055; A61B 1/128; A61B 1/00057; A61B 1/00097; A61B 1/0008; A61B 1/00183; A61B 1/0051; A61B 1/0052; A61B 1/0053; A61B 1/58
USPC ............... 600/151, 152, 146; 604/95.05, 530
See application file for complete search history.

(56) References Cited

U.S. PATENT DOCUMENTS

| | | | | |
|---|---|---|---|---|
| 4,884,557 A | * | 12/1989 | Takehana | A61B 1/0058 600/145 |
| 4,930,494 A | * | 6/1990 | Takehana | A61B 1/0058 600/145 |
| 5,179,934 A | * | 1/1993 | Nagayoshi | A61B 1/00183 600/152 |
| 5,531,664 A | * | 7/1996 | Adachi | A61B 1/0052 600/152 |
| 5,556,370 A | * | 9/1996 | Maynard | A61B 1/0058 600/142 |
| 8,558,878 B2 | | 10/2013 | Bousquet et al. | |
| 2008/0051704 A1 | | 2/2008 | Patel et al. | |
| 2014/0094655 A1 | * | 4/2014 | Newman | A61B 1/00183 600/109 |

FOREIGN PATENT DOCUMENTS

| | | | | |
|---|---|---|---|---|
| CN | 109996482 A | * | 7/2019 | ........... A61B 1/0055 |
| DE | 38 74 122 T2 | | 1/1993 | |
| EP | 0 304 380 B1 | | 3/1991 | |
| EP | 0 330 712 B1 | | 8/1992 | |
| EP | 2 042 076 B1 | | 9/2015 | |
| JP | H01-264795 A | | 10/1989 | |
| WO | WO-2006134881 A1 | * | 12/2006 | ........... A61B 1/0051 |
| WO | WO-2018165365 A2 | * | 9/2018 | ......... A61B 1/00045 |

OTHER PUBLICATIONS

International Preliminary Report on Patentability in PCT/DE2020/100029, dated Apr. 28, 2021, with English translation.
German Search Report in DE 10 2019 101 089.6, dated Nov. 27, 2019, with English translation.
International Search Report in PCT/DE2020/100029, mailed Apr. 21, 2020.

* cited by examiner

ACTUATOR FOR AN ENDOSCOPIC PROBE, ENDOSCOPIC PROBE AND METHOD FOR CONTROLLING AN ACTUATOR OF AN ENDOSCOPIC PROBE

CROSS REFERENCE TO RELATED APPLICATIONS

This application is the National Stage of PCT/DE2020/100029 filed on Jan. 16, 2020, which claims priority under 35 U.S.C. § 119 of German Application No. 10 2019 101 089.6 filed on Jan. 16, 2019, the disclosure of which is incorporated by reference. The international application under PCT article 21(2) was not published in English.

DESCRIPTION

The invention relates to an actuator for an endoscopic probe, to an endoscope probe and to a method for controlling an actuator of an endoscopic probe.

Endoscopic probes are used in the technical or medical sector to examine structures in difficult to access cavities. For this, the probes equipped with an elongated, flexible shaft are inserted into the cavity. The shaft has a shaft head at its front end, which is also called the distal end. The shaft head can specifically be equipped with a camera. A light source and/or a tool can also be arranged on the shaft head. The shaft of the probe generally has a channel through which supply lines for the camera, for the light source and, where applicable, for tools can be guided. An endoscopic probe differs from a rigid endoscope shaft in that it is flexible and can thus also be inserted in cavities with angled access. Image sensors using CCD or CMOS camera technology that are arranged directly at the shaft head are often used as image generators. Traditional image transmission via directed image bundle is not used.

To enable better examination of the cavity, endoscopic probes are equipped with a shaft head that can be moved relative to the shaft by at least one actuator. This makes it easier to align a camera, light source and/or tool arranged on the shaft head in the cavity. Actuators operated with pressure fluids (EP 0 304 380 B1) and actuators equipped with shape memory alloys (EP 2 042 076 B2, DE 38 74 122 T2) are known from the prior art. The actuators operated with pressure fluids have the disadvantage that a pressure fluid must be provided in the probe, which requires corresponding feed lines and takes up space in the probe. The actuators equipped with shape memory alloys have the disadvantage that the change in shape of the shape memory alloys requires heating to a specific temperature, however, this is often undesirable at the point of use of the probe. The shape memory alloys must first be heated by means of a heating device or supplied with current via an electrical conductor so that the current flowing through the shape memory alloy results in the alloy heating up. Depending on the area of use, additional cooling devices are necessary which result in a complicated design and take up space. The pressure fluids and the cooling equipment require a larger cross-section of the probe and also limit the probe length.

It is an object of the invention to provide an actuator for an endoscopic probe and an endoscopic probe with an actuator that do not require any pressure fluids and cooling equipment, on which the probe is not heated to a temperature above the specified threshold temperature, that reliably enable an adjustment of the shaft head relative to the shaft over a number of cycles, allow both a small and large shaft diameter and do not limit the probe length.

This object is solved by an actuator having the features of claim 1 and by an endoscopic probe having the features of claim 14. The actuator with the features of claim 1 is characterised in that it is equipped with an elongate shape memory wire made of shape memory alloy, an electrical conductor, a wire insulation surrounding the shape memory wire and a flexible sheath surrounding the wire insulation which is pressure-resistant in the longitudinal direction of the shape memory wire. The electrical conductor is electrically conductively connected to the shape memory wire here and supplies the shape memory wire with current. The shape memory wire is designed such that it converts the electrical energy of the current flowing through it into thermal energy and changes the length of the shape memory wire under the influence of this heat. The length of the shape memory wire measured in the longitudinal direction changes from a first length to a second length. A length contraction preferably occurs. A shape memory alloy is preferably chosen for this purpose with which any shape memory wire produced using this alloy exhibits the property that it contracts when a specified temperature is exceeded. The wire insulation which surrounds at least some sections of the shape memory wire consists of an electrically insulating material. It ensures that the current from the shape memory wire does not flow into the surroundings of the shape memory wire in an undesired and uncontrolled manner. The wire insulation insulates the shape memory wire against the sheath as well. This prevents an electrical current from being dispensed to the sheath. The sheath forms a guide for the shape memory wire and a counterbearing for supporting the tensile forces to be transmitted which are effective as a result of the change in shape of the shape memory wire. In contrast to the shape memory wire, the length of the sheath essentially remains constant in the longitudinal direction. Through a change in length of the shape memory wire relative to the sheath surrounding the shape memory wire, mechanical movements as well as tensile and compressive forces can be transmitted via the actuator.

At least one end of the sheath as well as one end of the shape memory wire can be mechanically fixed such that their position relative to one another does not change. A counterholder can be provided for this. The counterholder can have a first counterholder component for fixing the shape memory wire and a second counterholder component for fixing the sheath. In the event of a change in length of the shape memory wire, the end of the shape memory wire facing away from the counterholder moves relative to the end of the sheath facing away from the counterholder. It is either pulled further into the sheath or pushed out of the sheath, for example. The path travelled here can be transmitted to a shaft head of an endoscopic probe.

The design of the actuator is thus similar to that of a Bowden cable on which movement of a pull cable guided through a pressure-resistant sheath relative to the sheath is also used for the transmission of a mechanical movement as well as tensile and compressive forces.

The actuator is preferably designed here such that it has exactly one shape memory wire. This consists of a single piece or is comprised of several consecutive sections in the longitudinal direction. The shape memory wire is surrounded and enclosed by the wire insulation on all sides in the longitudinal direction. Excluded from this at most is the electrically conductive connection to the electrical conductor which supplies the shape memory wire with current, where present. The wire insulation is surrounded by the sheath so that the shape memory wire surrounded by the wire insulation is embedded in the sheath.

The shape memory wire can be longer or shorter than the sheath or have the same length.

One or both ends of the shape memory wire equipped with wire insulation can be arranged within the sheath or outside the sheath. This depends on the connection of the shape memory wire to an electrical conductor and a corresponding current supply, where applicable. Furthermore, this can be dependent on the respective application.

Shape memory alloys are special metal alloys that can exist in two different crystal structures. They are also often referred to as memory metals. While most metals always have the same crystal structure up to their melting point, shape memory alloys have two different structures depending on the temperature. The shape change occurs due to the change of the lattice structure depending on the temperature. There is generally the high-temperature phase called the austenite and the low-temperature phase called the martensite. These can merge by changing the temperature.

The structural transformation is independent of the speed of the temperature change. To initiate the phase transformation, the temperature and mechanical tension parameters are equivalent, meaning that the transformation can be caused not only thermally but also by mechanical tension.

The shape memory wire is heated by means of an electric current in order to achieve the required movement. This is not performed by an additional heating device, and particularly not by additional heating wires, but instead by a current that flows through the shape memory wire. Depending on the application, the applied voltage can be alternating voltage or constant or pulsed direct voltage, where applicable in a targeted manner with pulse width modulation. The heating occurs thanks to the specific resistance of the conductive material of the shape memory alloy with the help of the applied electrical voltage in the form of heat over the shape memory wire. The wire is located in an electrically insulating and largely thermally stable wire insulation which is in turn embedded in a sheath for the best possible power generation.

Operation of the actuator requires only a voltage source with which it is connected via the electrical conductor. The current flows over the electrical conductor from the voltage source to the shape memory wire. Pressure fluids are not required. Because the shape memory wire is heated directly by the current that flows through it, it is not necessary to heat the entire surroundings of the shape memory wire. This results in the actuator heating up less overall than known actuators with shape memory alloys that are additionally equipped with heating devices. Furthermore, the shape memory wire is surrounded by a wire insulation and by a sheath which reduce the heat emission. The use of a cooling device is therefore not necessary. The actuator has a small cross-section and is supplied solely via a current supply. It can thus be used in probes with a small diameter and with a large diameter. Furthermore, the probe length is not limited by the actuator as, other than the current supply for operation of the actuator, no other devices are needed. A corresponding current supply can be provided by means of an electrical conductor over long distances.

According to an advantageous embodiment of the invention, the change in length of the shape memory wire under the influence of the heat that is generated by the current flowing through it is a contraction. The shape memory wire contracts when current flows through it and it is thereby heated to a specified temperature. This contraction of the shape memory wire leads to a shortening of the length of the shape memory wire from a first length, which can also be referred to as the initial length, to a second length, which can be referred to as the fabrication length. This length contraction can be converted into a tensile force. A material with which the shape memory wire is mechanically lengthened before its insertion into the actuator is particularly suited as a shape memory alloy for the shape memory wire. The fabrication length dictated by the fabrication of the shape memory wire changes to the initial length of the shape memory wire here, where the fabrication length is smaller than the initial length. Under the influence of the heat that develops with the shape memory wire through which the current is flowing, the shape memory wire contracts again and goes into its fabrication length. A deformation temperature required for the corresponding deformation must be exceeded here. The initial length corresponds to the first length specified in claim 1 here. The fabrication length corresponds to the second length specified in claim 1. If current is no longer flowing through the shape memory wire and it cools below the deformation temperature, it can once again be mechanically lengthened so that it once again takes on its initial length. The tensile force required for this can either be provided by a spring or by a second actuator. Two actuators each can form an actuator pair with a first actuator and a second actuator. Both actuators are alternately supplied with current to deflect a shaft head of an endoscopic probe in one direction or the opposite direction. In the process, the tensile force of the first actuator is used to lengthen the shape memory wire of the second actuator back into the fabrication length. The tensile force of the second actuator is correspondingly used to lengthen the shape memory wire of the first actuator back into the fabrication length.

According to a further advantageous embodiment of the invention, the wire insulation forms a flexible guide tube between the shape memory wire and the sheath. The wire insulation thus not only provides electrical insulation of the shape memory wire from its surroundings, but also ensures the smoothest possible sliding of the shape memory wire in the sheath when the shape memory wire contracts or expands again relative to the sheath.

According to a further advantageous embodiment of the invention, the wire insulation is made of polyamide. This material is electrically insulating, thermally stable in the specified temperature range within which a deformation of the shape memory wire occurs when the actuator is operated and also has good sliding properties.

According to a further advantageous embodiment of the invention, the sheath is formed by a strip or wire that is wound into a cylindrical spiral. This type of spiral sheath exhibits the necessary requirements for compressive strength in the longitudinal direction and a flexibility in the radial direction, it is easy to produce and has a low weight.

According to a further advantageous embodiment of the invention, the spiral is wound out of metal. A strip made of spring steel, stainless steel or other metals, for example, is suitable for this use. The spirals can also be wound out of a wire.

According to a further advantageous embodiment of the invention, the sheath is equipped with a sheath insulation surrounding the sheath which thermally insulates the sheath from its surroundings. Heat emission of the actuator into the surroundings of the actuator due to the shape memory wire through which the current is flowing is thus prevented.

According to a further advantageous embodiment of the invention, one end of the shape memory wire is mechanically fixed at a counterholder. This dictates that a length change triggered by heating of the shape memory wire only has an impact on the opposite end of the shape memory wire.

The sheath is preferably also secured with one end at the counterholder. The counterholder can have a first counterholder component for fixing the shape memory wire and a second counterholder component for fixing the sheath.

According to a further advantageous embodiment of the invention, the shape memory wire is connected at the counterholder to the electrical conductor. Because the end of the shape memory wire fixed at the counterholder does not move, it is particularly well suited for the connection with the electrical conductor. A first counterholder component in particular which fixes one end of the shape memory wire can take a form that allows an electrically conductive connection to be established between the electrical conductor and the shape memory wire. If one end of the sheath is fixed at a second counterholder component, the second counterholder component is electrically insulated from the first counterholder component.

According to a further advantageous embodiment of the invention, a mechanical pull cable is connected at the one of the shape memory wire facing away from the counterholder. The pull cable forms the connecting piece here between the shape memory wire of the actuator and an endoscopic probe shaft head to be operated. With the pull cable, a distance between the shape memory wire and a shaft head of an endoscopic probe can be bridged within which no heating is to occur or within which no current is to flow.

According to a further advantageous embodiment of the invention, the shape memory wire is connected to the pull cable via a sleeve. As an alternative, the shape memory wire and the pull cable can be connected with one another by means of bonding, soldering, crimping or welding.

According to a further advantageous embodiment of the invention, at least some sections of the pull cable are also surrounded by the wire insulation and the sheath. As an alternative, the pull cable can also only be partially surrounded by the wire insulation. As an additional alternative, the pull cable can also only be partially surrounded by the sheath.

According to a further advantageous embodiment of the invention, the sheath extends over the essentially entire axial length of the shape memory wire and over the essentially entire axial length of the pull cable.

According to a further advantageous embodiment of the invention, the shape memory wire is connected at one end with the electrical conductor and at the other end to a reference potential, preferably to a zero potential. This zero potential is also referred to as the earth.

The endoscopic probe with the features of claim 14 is characterised by an elongate shaft which has the form of a hollow body, by a shaft head on the distal end of the shaft, wherein the shaft head can be moved relative to the shaft, and by at least one actuator according to the invention which aligns the shaft head relative to the shaft. The number of actuators used depends on the application of the endoscopic probe. If only one movement of the shaft head relative to the shaft in one direction is necessary, one or two actuators can be used in the probe. To move the shaft head in a plane perpendicular to this, the probe can be turned around the longitudinal axis of the shaft. With movement of the shaft head in at least two directions, the probe can be equipped with three or four actuators. With only one or two actuators, the cross-section of the shaft is smaller than with three or four actuators. An embodiment of the invention with three actuators has the advantage that the cross-section of the shaft is smaller than with four actuators and yet still allows movement of the shaft head in several directions. With a probe with three actuators, two actuators are preferably used to move the shaft head back into its starting position following a deflection by the third actuator and if necessary to pull the shape memory wire of the third actuator back to its initial length. Two actuators must be activated and supplied with current at the same time. The performance of the three actuators may differ here depending on the activation.

To operate the actuators of the probe, operating equipment is provided for the user. This can be a control lever or stick, one or more slide controls or a cursor control for the monitor of a computer. This operating equipment is connected to a control device which supplies the actuators with current from a voltage source in a targeted manner.

According to a further advantageous embodiment of the invention, the actuator is arranged in the shaft of the endoscopic probe. The tensile force exerted by the shape memory wire is transferred to the shaft head. The shape memory wire is directly or indirectly connected to the shaft head for this purpose.

According to a further advantageous embodiment of the invention, the actuator is aligned with its longitudinal axis essentially parallel to the longitudinal axis of the shaft.

According to a further advantageous embodiment of the invention, at least two actuators are arranged in the shaft of the endoscopic probe in such a manner that the shape memory wires of the actuators are offset to one another in the axial direction of the shaft and are free of overlapping in the axial direction. As a result, it is not possible for the shape memory wires to heat each other up through heat emission. This type of mutual heating can lead to distortion of the movement of the actuators. A mutual thermal influence or other interference of the actuators with one another is prevented by the offset arrangement.

According to a further advantageous embodiment of the invention, the endoscopic probe is equipped with a power supply. Furthermore, the endoscopic probe is equipped with a control device which supplies the at least one actuator for moving the shaft head with current in such a manner that the actuator deflects the shaft head out of a specified starting position and moves it into a specified end position and moves the shaft head out of the end position back into its starting position. Movement of the shaft head is performed using the control device in accordance with the specifications stipulated by a user of the endoscopic probe.

Operating equipment can be provided for this. This type of operating equipment for a user to operate endoscopic probes is known from the prior art.

According to a further advantageous embodiment of the invention, the operating equipment is designed to determine the resistance of the shape memory wire of the actuator or the actuators and, from the resistance, the actual state of the deflection of the shape memory wire to compare this with a specified target state of the deflection of the shape memory wire. It is not necessary to permanently apply current to the shape memory wire. At regular short breaks in the current feed of a few parts of a second, the electrical resistance can be measured and at the same time the position of the actuator recorded in order to avoid overloading of the actuator and of the connected mechanics.

According to a further advantageous embodiment of the invention, the endoscopic probe is equipped with at least one temperature sensor. The temperature recorded by the temperature sensor is output at the control device. Based on the specified resistance characteristic, the temperature of the shape memory wire can be used as an indication of its specific resistance. This resistance can be compared with any measured resistance. Using the temperature and resistance, the actuator can be controlled by means of the control device. The actual state of the actuator can be recorded and compared with a target state.

According to a further advantageous embodiment of the invention, the endoscopic probe is equipped with at least a first temperature sensor that determines the temperature at the shape memory wire of the actuator or actuators. It is thus possible to record whether the temperature prevalent at the shape memory wire is in line with the temperature specified by the flowing current and the resistance. Influences due to heat transfer or heat emission from the surroundings of the shape memory wire can thus be recorded and taken into account by the control device.

According to a further advantageous embodiment of the invention, the endoscopic probe is equipped with a second temperature sensor that determines the ambient temperature of the shaft or the shaft head. In this manner, any influence of a heat source in the surroundings of the shape memory wire can also be eliminated.

According to a further advantageous embodiment of the invention, exactly one actuator is arranged in the shaft which moves the shaft head from its starting position to its end position. To move the shaft head back into its starting position, the endoscopic probe is equipped with a spring. In this case, the shaft head can only be deflected in one direction and moved back into its starting position. To enable deflection of the shaft head in a different direction, the endoscopic probe as a whole can be turned around the longitudinal axis of the shaft.

According to a further advantageous embodiment of the invention, the endoscopic probe is equipped with an even number of actuators. Two actuators each form an actuator pair with a first actuator and a second actuator. If the shaft head is deflected by the first actuator and moved from its starting position into an end position, the second actuator ensures that the shaft head is then moved back into the starting position. The same applies in the event that the shaft head is deflected by the second actuator. The first and the second actuator are counterparts in this case.

According to a further advantageous embodiment of the invention, the shaft has an elongate cross-section. The cross-section can in particular be rectangular. The elongate shaft has the form of a blade or lance here.

According to a further advantageous embodiment of the invention, the shaft head can be turned relative to the shaft around a shaft head rotation axis that is aligned essentially perpendicular to the longitudinal axis of the shaft.

According to a further advantageous embodiment of the invention, the shaft head has the form of a rotary plate. If shaft head in the form of a rotary plate is combined with a shaft in the form of a blade or lance and if the rotary plate is aligned parallel to the blade or lance-shaped shaft, the probe overall has a flat form. These type of probes are suitable for testing and examining turbines and pipe bundles in heat exchangers. These type of probes can be inserted into a cavity reproducibly by a robot or manipulator at the intended point of use. The probe for insertion in the cavity can be coiled here. While known probes are generally strongly hampered with regard to movement with coiled storage of the probe, this has no adverse effect on the probe according to the invention. The probe according to the invention also differs from known probes in that only the shaft head is moved relative to the shaft and the entire shaft is not angled.

According to a further advantageous embodiment of the invention, the shape memory wire is directly fixed at the shaft head.

According to a further advantageous embodiment of the invention, the shaft head has several ring or tube-shaped shaft head segments that can be moved relative to one another, which can be aligned relative to one another by the actuator/actuators. The shaft head segments can have openings for this purpose through which the shape memory wires of the actuators or pull cables connected to these are guided.

According to a further advantageous embodiment of the invention, the shaft head segments are made of plastic or of a different electrical insulator.

According to a further advantageous embodiment of the invention, the shaft head segments have openings through which the shape memory wires or pull cables connected to the shape memory wires of the actuators are guided.

The method for controlling the actuators of an endoscopic probe is characterised in that the temperature at the actuator is recorded, that the resistance of the shape memory wire of the actuator is recorded and that the current with which the shape memory wire is supplied is controlled depending on the temperature and the resistance.

Further advantages and advantageous embodiments of the invention can be obtained from the following description, the drawing and the claims.

DRAWING

Figure 2:
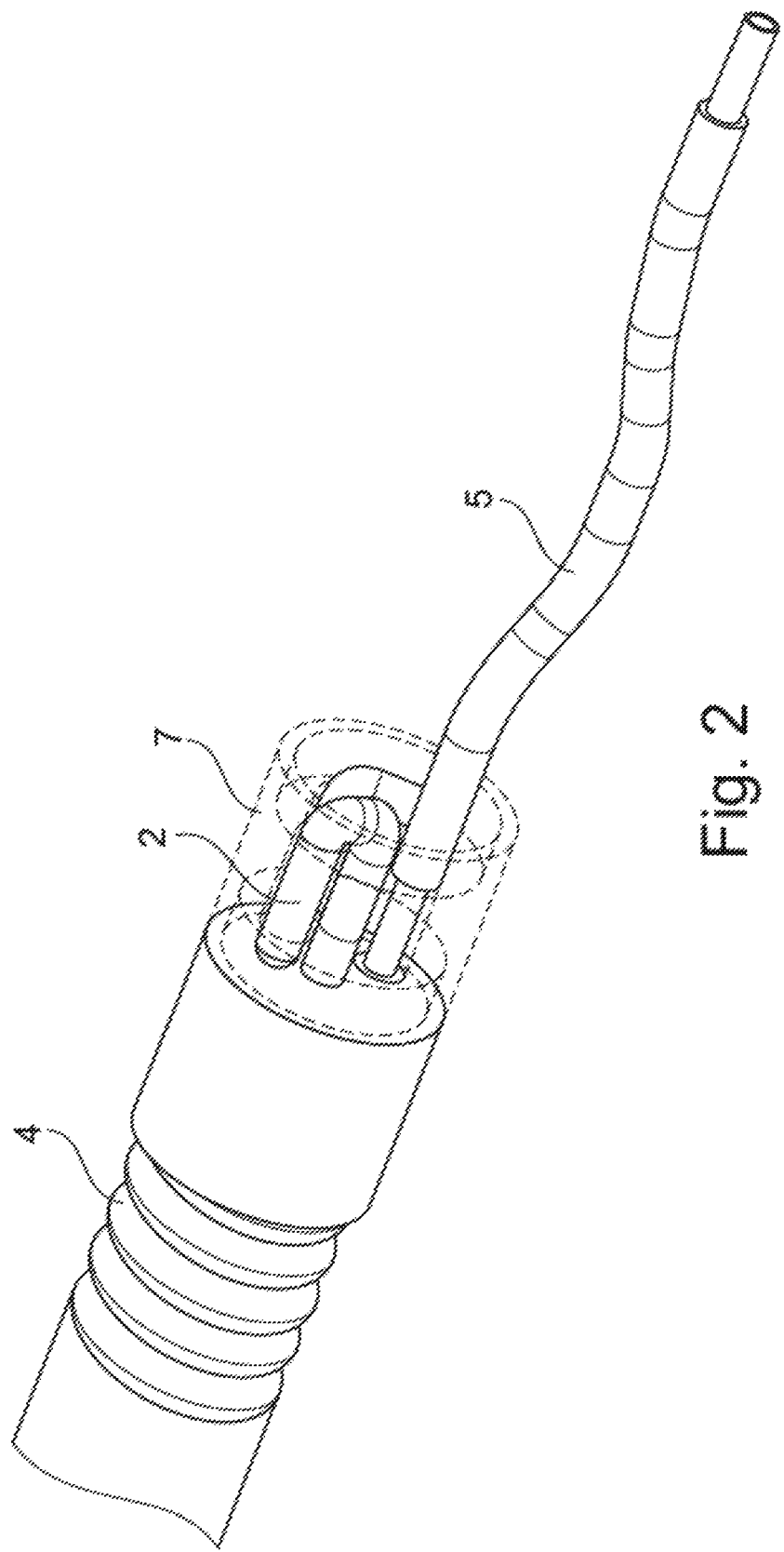
Figure 3:
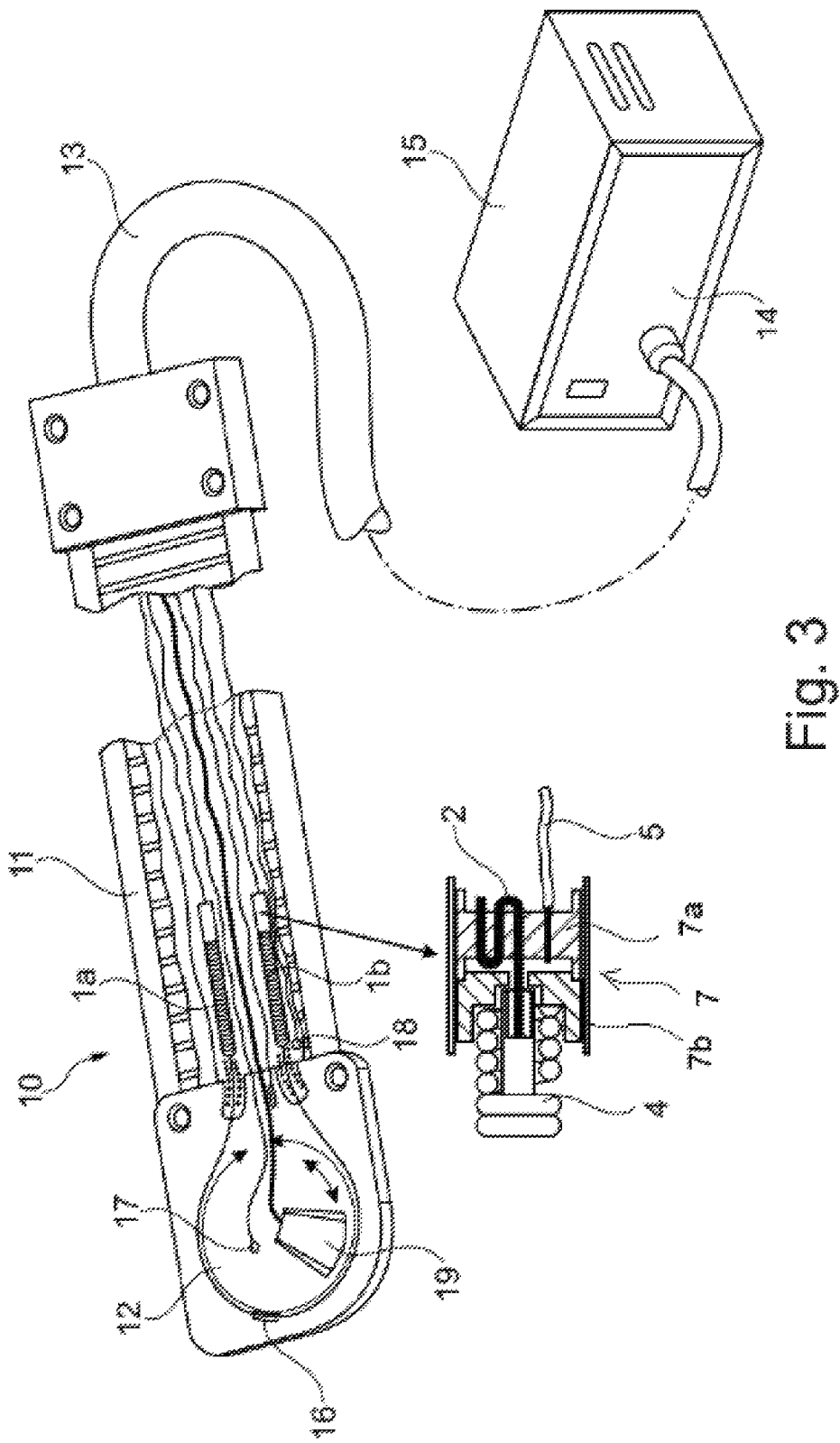
Figure 4:
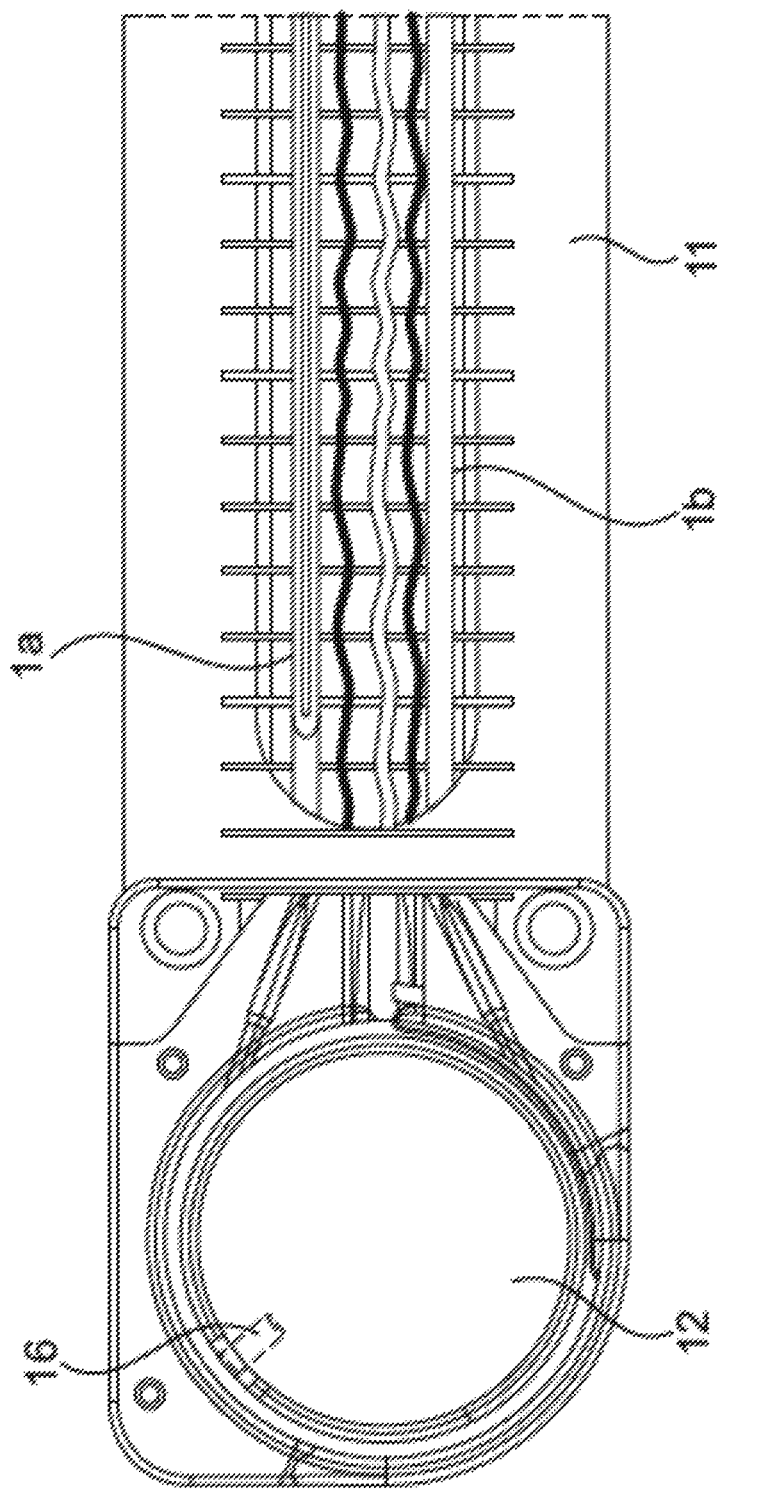
Figure 5:
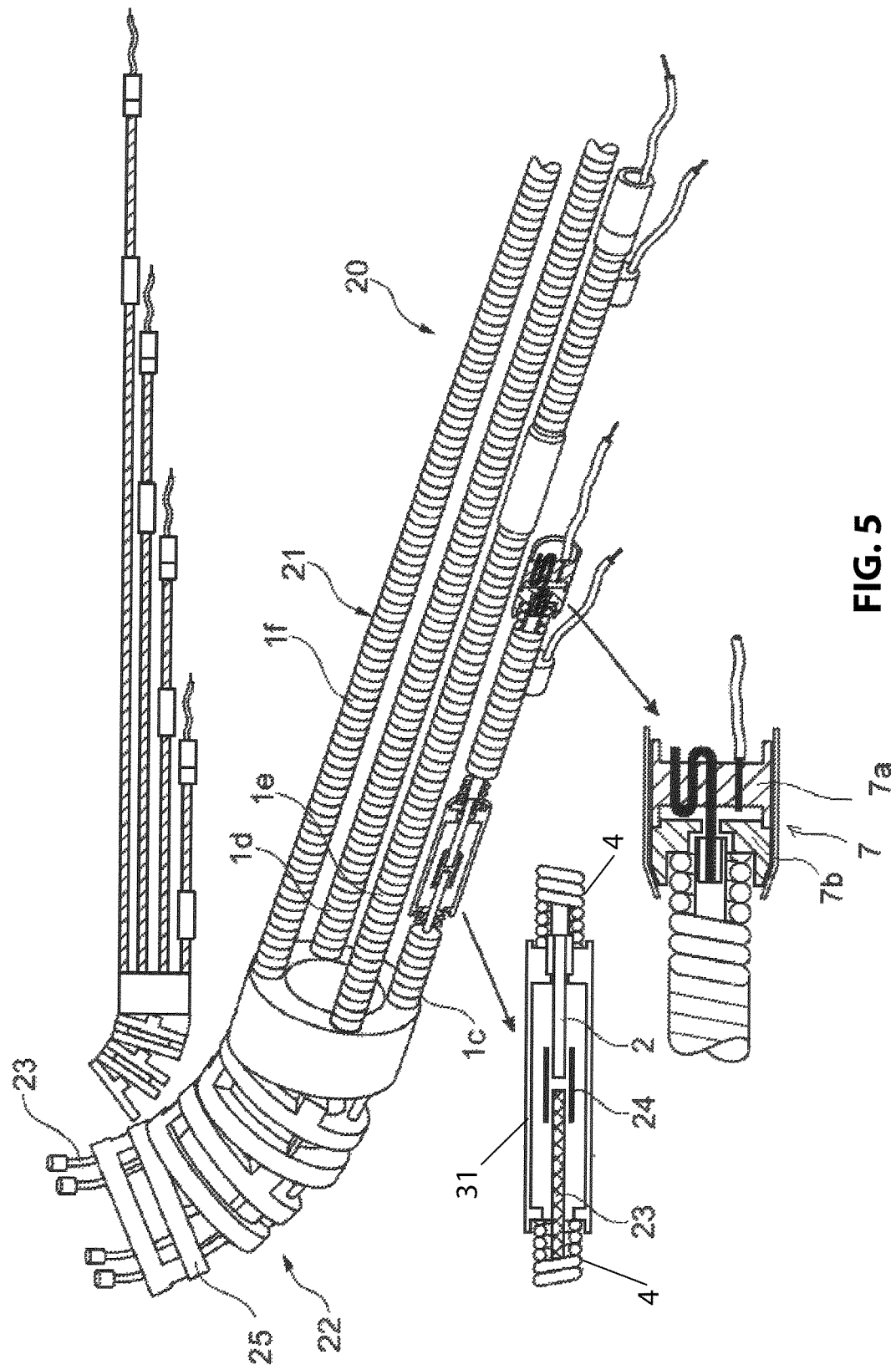
Figure 6:
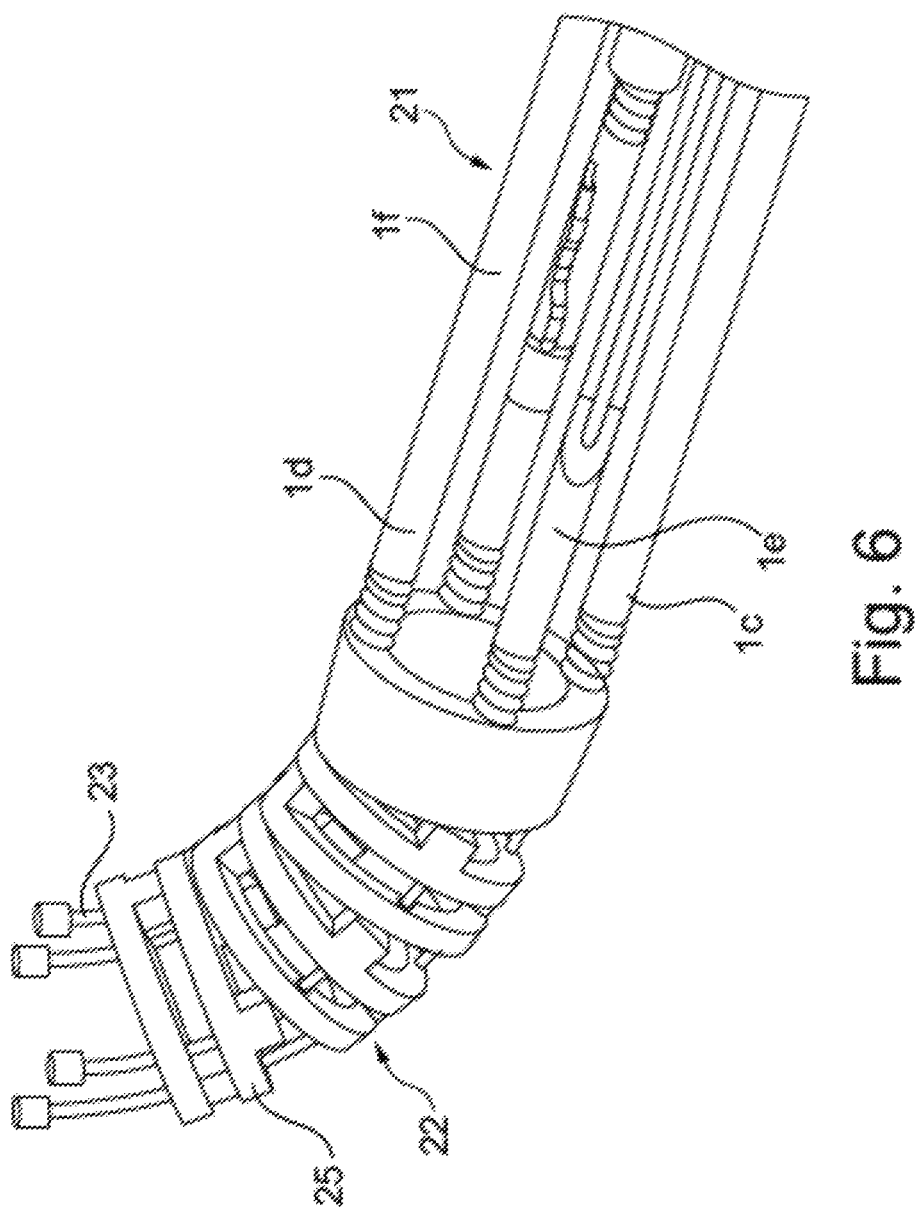
Figure 7:
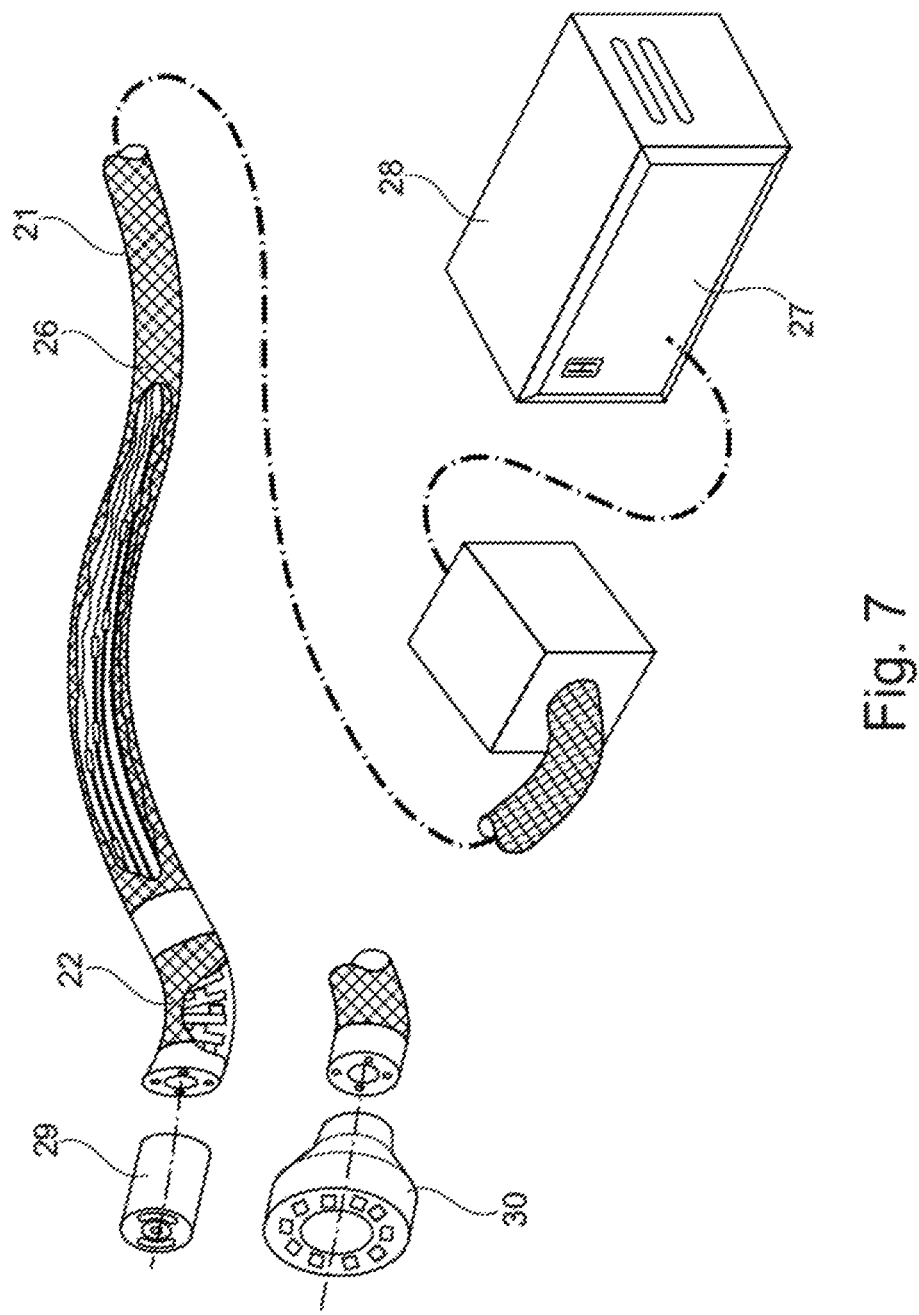

Model embodiments of an actuator according to the invention and two endoscopic probes according to the invention are represented in the drawing. Illustrations:

FIG. 1 Detail from an actuator in a side view,

FIG. 2 Counterholder and electrical conductor of the actuator according to FIG. 1, FIG. 3 First model embodiment of an endoscopic probe, FIG. 4 Part of the shaft with shaft head of the probe according to FIG. 3, FIG. 5 Second model embodiment of an endoscopic probe, FIG. 6 Part of the shaft with shaft head of the probe according to FIG. 5, FIG. 7 Probe according to FIG. 5 with a surrounding tube.

DESCRIPTION OF THE MODEL EMBODIMENTS

FIGS. 1 and 2 represent a model embodiment of an actuator 1 in a side view. Actuator 1 has a shape memory wire 2, a wire insulation 3, a sheath 4, a first electrical conductor 5 which can be connected to a voltage source (not shown) and supplies the shape memory wire 2 with current, and a second electrical conductor 6 which connects the shape memory wire 2 to the zero potential. The shape memory wire 2 is surrounded by the wire insulation 3, which in turn is surrounded by the sheath 4. The sheath 4 comprises a spring steel strip which is wound into a cylindrical spiral. The sheath 4 is only partially shown in FIG. 1. However, it actually extends from a counterholder 7 shown in FIG. 2 to the opposite end of the actuator, which is not shown in FIGS. 1 and 2. The shape memory wire 2 and sheath 4 are fixed at the counterholder 7. The shape memory wire 2 is guided through several openings of the counterholder 7 for this. The section of the counterholder 7 that has openings is displayed transparently in FIG. 2. The counterholder 7 is partially made of a conductive material. In the counterholder 7, the first electrical conductor 5 is arranged in such a way that the electrical current can flow from the first electrical conductor 5 to the shape memory wire 2. The current from the shape memory wire 2 can flow off via the second electrical conductor 6. The section of the counterholder 7 that is connected to the sheath 4 is electrically insulated against the conductive section of the counterholder 7. The counterholder 7 has a first counterholder component 7a for supporting the shape memory wire 2 and a second counterholder component for supporting the sheath 4. Both counterholder components 7a, 7b are shown in the FIGS. 3 and 5.

The end of the shape memory wire 2 facing away from the counterholder 7 which is not shown in FIGS. 1 and 2 either protrudes from the sheath 4 or the shape memory wire 2 is connected to a pull cable (not shown) inside the wire insulation 3 and the sheath 4 and this pull cable protrudes from the sheath 4. The part protruding from the sheath is connected with a movable shaft head of the endoscopic probe. Model embodiments are shown in the FIGS. 3 to 7.

If an electrical current flows through the shape memory wire 2 which is fed through the first electrical conductor 5 and conducted away by the second electrical conductor, the shape memory wire 2 heats up. As a result of this heating, the shape memory alloy of the shape memory wire undergoes a shape change based on a temperature-dependent lattice transformation to one of the two crystal structures of the shape memory alloy. This leads to the length of the shape memory wire being shortened. Because the one end of the shape memory wire 2 is fixed at the counterholder 7 and the sheath 4 is also secured at the counterholder 7 and retains its axial length, the end of the shape memory wire 2 facing away from the counterholder moves relative to the sheath 4. This movement is transferred to a shaft head. A tensile force then acts on the shaft head.

FIGS. 3 and 4 represent a first model embodiment of an endoscopic probe 10. The probe 10 comprises an elongate shaft 11 and a shaft head 12 that can be moved relative to the shaft 11. The shaft 11 is connected via a cable 13 with a housing which contains a power supply 14 and a control device 15. The shaft 11 has a rectangular cross-section so that it takes the form of a blade or lance. The surface of the shaft 11 facing the viewer in FIGS. 3 and 4 is larger than the surface of the shaft 11 aligned perpendicular to this. The shaft head 12 takes the form of a rotary plate. The rotation axis of this rotary plate runs perpendicular to the drawing plane in FIGS. 3 and 4 and thus perpendicular to the longitudinal axis of the shaft 11. Two actuators 1a, 1b are arranged in the shaft 11 which line up with the actuator according to FIGS. 1 and 2. The corresponding reference numbers are thus used for the individual components of the actuators in FIGS. 3 and 4 as were used in FIGS. 1 and 2. The shape memory wire 2 of the two actuators 1a, 1b protrudes from the sheath 4 with its side facing away from the counterholder 7. The counterholder 7 has a first counterholder component 7a in which the shape memory wire 2 is fixed with one end. In the first counterholder component 7a, the first electrical conductor 5 is also housed such that the first electrical conductor is electrically conductively connected to the shape memory wire. Furthermore, the counterholder 7 also has a second counterholder component 7b in which one end of the sheath 4 is fixed. Both counterholder components 7a and 7b are designed such that the sheath 4 is electrically insulated against the first electrical conductor 5 and the shape memory wire 2.

The distal end of the shape memory wire 2 facing away from the counterholder 7 is guided around a section of the outside of the shaft head 12 in the form of a rotary plate and secured at the shaft head 12 by means of a screw 16. Heating of the shape memory wire of the actuator 1a thus leads to a clockwise rotation of the shaft head. Heating of the shape memory wire of the actuator 1b leads to an anticlockwise rotation of the shaft head. Both rotation directions are shown by arrows in FIG. 3. Using a first temperature sensor 17 and a second temperature sensor 18, the temperature is recorded at the shaft head 12 and at the shaft 11 and output to the control device 15. Both temperature sensors are connected to the control device 15 for this purpose. The control device takes into account the recorded temperature when specifying the current with which the actuators are supplied.

A camera 19 is arranged on the shaft head 12.

FIGS. 5, 6 and 7 represent a second model embodiment of an endoscopic probe 20. FIG. 5 shows the probe 20 in various views. The probe 20 has an elongate shaft 21 and a shaft head 22. The shaft is equipped with a total of four actuators 1c, 1d, 1e, 1f which line up with the actuator according to FIGS. 1 and 2. The actuators are arranged in the shaft 21 in the axial direction in such a manner that the shape memory wires do not overlap in the axial direction. They are offset relative to each other. This is shown in the upper part of FIG. 5. The axial length of the actuators 1c, 1d, 1e, 1f differs. The actuator 1c has the shortest length in the axial direction and the actuator 1f has the longest. At the distal ends, the shape memory wires 2 are connected with pull cables 23 via a sleeve 24. This is shown in a detail of actuator 1c. The shaft head has several ring-shaped shaft head segments 25. Two actuators 1c, 1d and 1e, 1f each form an actuator pair. In an actuator pair, the movements of the respective actuator are compensated by the movement of the respective other actuator so that the shaft head 22 returns to its starting position.

The ring-shaped shaft head segments 25 are equipped with several openings through which the pull cables 23 are guided. A movement of the actuators 1c, 1d, 1e, 1f leads to the shaft head segments 25 being aligned relative to one another.

FIG. 7 shows the endoscopic probe according to FIGS. 5 and 6 with a tube 26 which surrounds the entire probe 20 and with a combined power supply 27 and control device 28. The probe has a considerable axial length here. A camera 29 or 30 can be connected on the shaft head 22.

The sleeve 24 is radially enveloped by a housing 31 that axially connects sections of the sheath 4 so that the sleeve 24 is inside the housing but outside sheath 4 and housings 31 of the actuators 1c, 1d, 1e, 1f are offset from another in the axial direction of the elongate shaft 21 and are free from overlapping in the axial direction of the elongate shaft 21.

All features can be material to the invention both individually and in any combination.

REFERENCE NUMBERS

1 Actuator
1a Actuator
1b Actuator
1c Actuator
1d Actuator
1e Actuator
1f Actuator
2 Shape memory wire
3 Wire insulation
4 Sheath
5 First electrical conductor
6 Second electrical conductor 7 Counterholder
7a First counterholder component
7b Second counterholder component
8
9
10 Endoscopic probe
11 Shaft
12 Shaft head
13 Cable
14 Power supply
15 Control device
16 Screw
17 First temperature sensor
18 Second temperature sensor
19 Camera
20 Endoscopic probe
21 Shaft
22 Shaft head
23 Pull cable
24 Sleeve
25 Shaft head segment
26 Tube
27 Power supply
28 Control device
29 Camera
30 Camera
31 Housing

What is claimed is:

1. An endoscopic probe, comprising:
an elongate shaft which has a form of a hollow body, the elongate shaft including
a proximal end of the elongate shaft,
a distal end of the elongate shaft,
a shaft head on the distal end of the elongate shaft, wherein the shaft head is movable relative to the elongate shaft;
at least two actuators which align the shaft head relative to the elongate shaft, each of the at least two actuators respectively including
an elongate shape memory wire including a shape memory alloy,
an electrical conductor which is electrically connected to the elongate shape memory wire and supplies the elongate shape memory wire with current, wherein the elongate shape memory wire is configured to convert electrical energy of the current flowing through it into thermal energy and to change its length from a first length to a second length under an influence of the thermal energy which heats the elongate shape memory wire to a specific temperature and heats the at least two actuators;
wire insulation which surrounds at least sections of the elongate shape memory wire and includes an electrically insulating material, and
a sheath which is pressure-resistant in a longitudinal direction of the shape memory wire, which forms a guide for the shape memory wire, and forms a counterbearing configured to support tensile forces to be transmitted which are effected as a result of the change in shape of the elongate shape memory wire, and which surrounds the wire insulation,
wherein the elongate shaft does not include pressure fluids, and
wherein the at least two actuators are arranged in the elongate shaft so that the elongate shape memory wires of the at least two actuators are offset from one another in the axial direction of the elongate shaft and are free of any overlapping in the axial direction of the elongate shaft so that a heat transfer between the at least two actuators is reduced and a heat transfer between the respective shape memory wires heated to the specific temperature is reduced, wherein the change in length of the elongate shape memory wire under the influence of the heat that is generated by the current flowing through it is a contraction,
wherein one end of the elongate shape memory wire is mechanically fixed at a counterholder, and wherein the sheath is also secured with its end at the counterholder,
wherein a mechanical pull cable is connected at the end of the elongate shape memory wire facing away from the counterholder,
wherein the elongate shape memory wire is connected to the mechanical pull cable via a sleeve,
wherein the at least two actuators have different length, each of the at least two actuators includes an elongate shape memory wire that does not overlap with any elongate shape memory wire of another of the at least two actuators in the axial direction of the elongate shaft,
wherein each elongate shape memory wire has a different axial distance from the shaft head,
wherein the sheath is provided in axial sections and the shape memory wire is not contiguous with the sheath, and
wherein the sleeve is radially enveloped by a housing that axially extends along an entirety of the sleeve and that axially connects two sections of the sheath, and sleeves and housings of the at least two actuators are offset from another in the axial direction of the elongate shaft and are free from overlapping in the axial direction of the elongate shaft.

2. The endoscopic probe according to claim 1, wherein the wire insulation forms a flexible guide tube between the shape memory wire and the sheath.

3. The endoscopic probe according to claim 1, wherein the wire insulation is made of polyamide.

4. The endoscopic probe according to claim 1, wherein the sheath is formed by a strip or wire that is wound into a cylindrical spiral.

5. The endoscopic probe according to claim 4, wherein the cylindrical spiral is wound out of metal.

6. The endoscopic probe according to claim 1, wherein the sheath is equipped with a sheath insulation surrounding the sheath which thermally insulates the sheath from its surroundings.

7. The endoscopic probe according to claim 1, wherein the elongate shape memory wire is connected to the counter holder with the electrical conductor.

8. The endoscopic probe according to claim 1, wherein at least some sections of the mechanical pull cable are also surrounded by the wire insulation and the sheath.

9. The endoscopic probe according to claim 1, wherein the elongate shape memory wire is connected at one end to the electrical conductor and at the other end to a reference potential.

10. The endoscopic probe according to claim 1, wherein the actuator is arranged in the shaft.

11. The endoscopic probe according to claim 10, wherein the actuator is aligned with its longitudinal axis essentially parallel to the longitudinal axis of the shaft.

12. The endoscopic probe according to claim 1, further comprising:
a power supply; and
a control device which supplies at least one actuator for moving the shaft head with current in such a manner that the actuator deflects the shaft head out of a specified starting position and moves the shaft into a specified end position, and moves the shaft head out of the specified end position back into the specified starting position.

13. The endoscopic probe according to claim 12, wherein the control device is configured to measure an electrical resistance of the shape memory wire of the actuator or of the actuators and to determine from the electrical resistance the actual state of the deflection of the shape memory wire to compare this with a specified target state of the deflection of the shape memory wire.

14. The endoscopic probe according to claim 1, further comprising: at least one temperature sensor.

15. The endoscopic probe according to claim 14, wherein the at least one temperature sensor includes at least one first temperature sensor that determines the temperature at the elongate shape memory wire of the at least two actuators.

16. The endoscopic probe according to claim 14, wherein the at least one temperature sensor includes one second temperature sensor that determines an ambient temperature of the elongate shaft or the shaft head.

17. The endoscopic probe according to claim 1, wherein in the shaft exactly one actuator is arranged that moves the shaft head out of its starting position into its end position and that the endoscopic probe is additionally equipped with a spring that moves the shaft head from its end position back into the starting position.

18. The endoscopic probe according to claim 12, further comprising: an even number of actuators, of which two actuators in each case form an actuator pair with a first actuator and a second actuator, wherein the two actuators of an actuator pair both expand their elongate shape memory wires to a specified second length.

19. The endoscopic probe according to claim 1, wherein the elongate shaft has an oblong cross-section.

20. The endoscopic probe according to claim 1 wherein the shaft head can be turned relative to the elongate shaft around a shaft head rotation axis that is aligned perpendicular to the longitudinal axis of the elongate shaft.

21. The endoscopic probe according to claim 20, wherein the shaft head has the form of a rotary plate.

22. The endoscopic probe according to claim 1, wherein the elongate shape memory wire of the actuator is directly attached to the shaft head.

23. The endoscopic probe according to claim 1, wherein the shaft head has several ring or tube-shaped shaft head segments that can be moved relative to one another, and which can be aligned by the at least two actuators.

24. The endoscopic probe according to claim 23, wherein the shaft head segments are made of plastic.

25. The endoscopic probe according to claim 23, wherein the shaft head segments have openings through which the elongate shape memory wires or pull cables connected to the elongate shape memory wires of the actuators are guided.

26. A method for controlling the actuator of the endoscopic probe according to claim 1, the method comprising:
detecting an electrical resistance of the elongate shape memory wire of an actuator of the at least two actuators;
detecting a temperature at the actuator or in its vicinity;
monitoring the electrical resistance as a factor of the temperature; and
controlling the current for the elongate shape memory wire of the actuator using the temperature and/or the electrical resistance.

* * * * *